United States Patent [19]

Jackson et al.

[11] 4,210,212

[45] Jul. 1, 1980

[54] TOOL MOUNTING WITH MEMBER LOCATABLE IN FIRST AND SECOND POSITION BETWEEN STANDARD AND FRAME

[75] Inventors: William W. Jackson, Bettendorf; James G. Steinbach, Davenport, both of Iowa; Lon R. Geiger, Rock Island, Ill.

[73] Assignee: Deere & Company, Moline, Ill.

[21] Appl. No.: 922,046

[22] Filed: Jul. 5, 1978

[51] Int. Cl.² .................. A01B 15/00; A01B 65/02
[52] U.S. Cl. .................................. 172/645; 172/742; 403/409
[58] Field of Search ............... 172/152, 154, 254, 283, 172/285, 286, 314, 569, 574, 576, 600, 603, 645, 647, 656, 673, 693, 695, 742, 751, 753; 403/3, 4, 374, 409, DIG. 9; 85/50 A, 50 C

[56] References Cited

U.S. PATENT DOCUMENTS

| 756,699 | 4/1904 | Poirier | 172/603 X |
| 1,652,287 | 12/1927 | Moore | 172/753 |
| 2,274,438 | 2/1942 | Stoner | 172/603 |
| 2,617,344 | 11/1952 | Carney | 172/574 X |
| 3,782,481 | 1/1974 | Quanbeck | 172/705 X |

FOREIGN PATENT DOCUMENTS

| 253271 | 3/1967 | Austria | 172/645 |
| 267927 | 1/1969 | Austria | 172/742 |
| 304070 | 2/1918 | Fed. Rep. of Germany | 172/705 |
| 747264 | 3/1933 | France | 403/4 |

Primary Examiner—Richard T. Stouffer

[57] ABSTRACT

An angularly adjustable bracket structure is provided for mounting tool-carrying standards on the frame of an agricultural implement. The bracket structure includes a bracket having three adjoining vertical faces which are angularly offset from one another and which can be abutted to the frame to adjust the tool between three positions and provide selected widths of cut between the tools. A wedge element is removably insertable between the frame and two faces of the bracket to position the third face in abutment with the frame.

20 Claims, 9 Drawing Figures

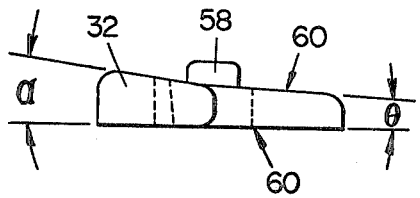
FIG. 7
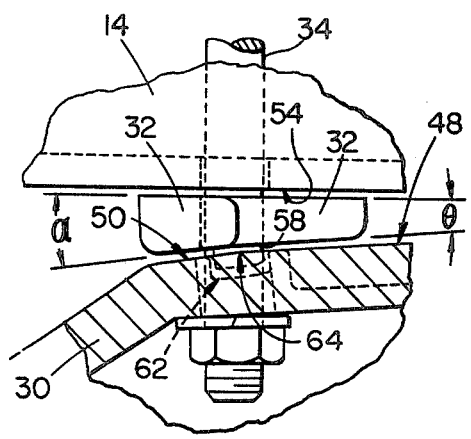
FIG. 8
FIG. 9
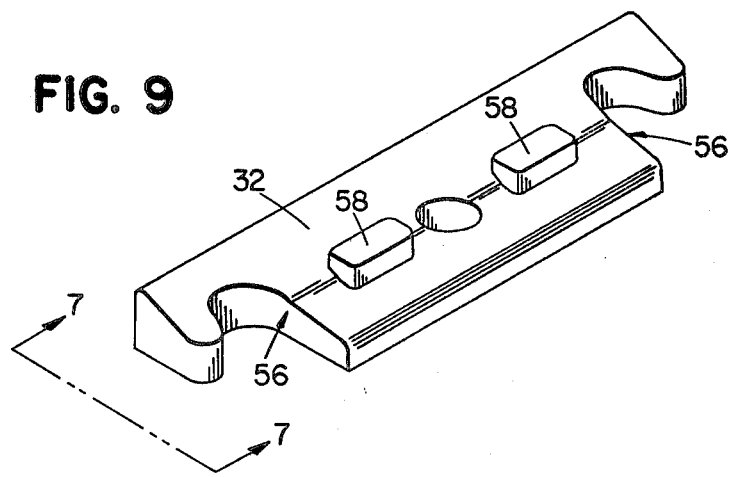

TOOL MOUNTING WITH MEMBER LOCATABLE IN FIRST AND SECOND POSITION BETWEEN STANDARD AND FRAME

BACKGROUND OF THE INVENTION

The present invention relates generally to agricultural implements and more particularly relates to a manually adjustable bracket structure for mounting a plow standard on an implement frame.

Agricultural operations utilizing earthworking tools such as plows often require that the lateral spacing between the tools be adjusted to vary the width of cut. Such a change is often desirable to match the horsepower and traction of the tractor with particular soil conditions. Further, plowing productivity can be improved by changing width of cut, as for example, when finishing the ends and edges of a hillside or a field or plowing under alfalfa pastures or bean ground.

Plows and similar earthworking tools have in the past been rigidly mounted to the toolbar at fixed lateral spacings. Accordingly, a dealer had to maintain a significant inventory of units to provide the widths and spacings necessary for the soil conditions and tractors in his area. The farmer who wanted to maximize his productivity had to either purchase more than one unit or spend substantial time adjusting the width of the spacing between the tools whenever soil conditions or crop conditions required a significant change in that spacing.

To overcome this problem, implements have been introduced with mechanisms for adjustably spacing the tools on the frame. See, for example, the John Deere Model 2800 Plow. These implements provide tool-supporting standards which are pivotally mounted to the frame and connected by a hydraulically actuated linkage for simultaneous swinging movement. The interconnecting linkage adjusts each standard relative to the beam and therefore adjusts the angular relationship between each standard and the beam to change the width of the cut between the tools. To provide the continuously variable selection of widths of cut between the tools, these implements possess extensive hydraulics and mechanical linkages and require substantial expense to manufacture as well as maintain.

Less expensive manually adjustable mounting structures have also been made available. See, for example, the John Deere Model 3200 Drawn Plow which provides a mounting bracket that can be adjusted between two angular positions. See, also, the John Deere Model S3531 Integral Disk Plow which provides a mounting bracket adjustable between three positions. The adjustments required to the mounting brackets on each of these models, however, requires considerable time and effort. Further, these structures do not couple the mounting brackets with the implement frame so as to resist the torque and other forces commonly encountered by the earthworking tools and standard.

SUMMARY OF THE INVENTION

Accordingly, it is an object to provide an inexpensive manually adjustable tool-mounting structure which can be angularly adjusted with respect to the frame. It is also an object to provide a structure which permits adjustments of the width of cut between the tools in a simple and quick manner.

Yet another object is to provide a mounting structure which can be quickly and easily adjusted by a single individual with few tools. A further object is to provide a mounting structure which is angularly adjustable between three positions and which is securely coupled with the frame to resist the forces encountered by the tool and its standard.

It is further an object to provide a simple, rugged and durable mounting structure that minimizes both the manufacturing and maintenance expenses.

Also an object is a structure which requires few parts yet permits the dealer to assemble the standards and tools at various lateral spacings to provide whatever width is required while maintaining the dealer's inventory at the lowest reasonable volume.

BRIEF DESCRIPTION OF THE DRAWINGS

FIG. 7 is a view of an alternate wedge embodiment similar to the view shown in FIG. 4.

FIG. 8 is a view similar to FIG. 6, but illustrating the alternate wedge embodiment in place between the bracket and frame.

FIG. 9 is an enlarged perspective of the alternate wedge embodiment.

DESCRIPTION OF THE PREFERRED EMBODIMENT

Figure 1:
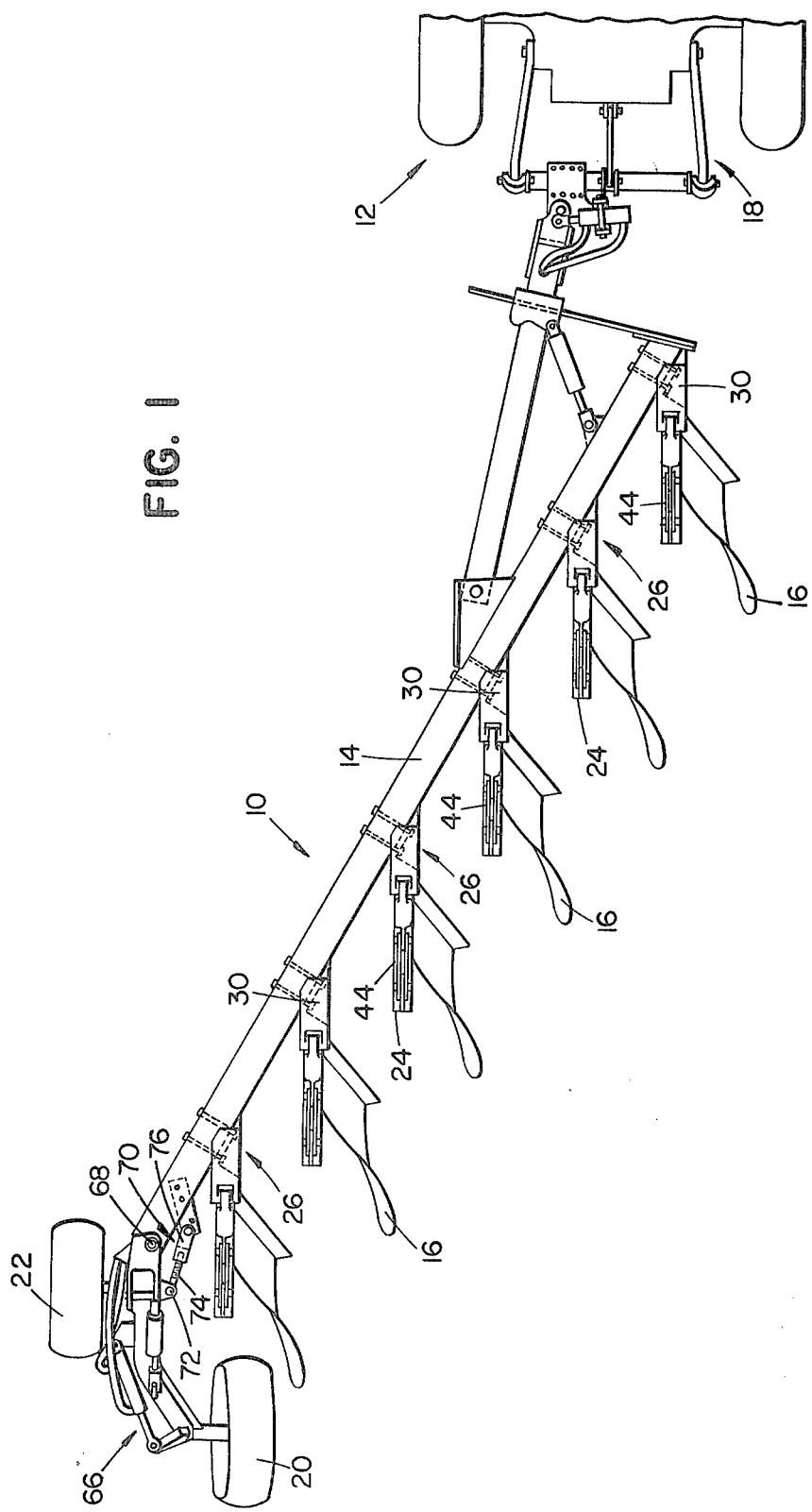
FIG. 1 is a top view of an implement utilizing the structure of the present invention.

Looking now to FIG. 1, there is illustrated an earthworking implement 10 utilizing the mounting structure of the invention. The implement 10 is attached to a tractor 12 (partially shown) and includes a longitudinally extending generally horizontal frame member 14 supporting plow bottoms 16 at equally spaced intervals. The frame 14 is supported at its front by the three-point hitch 18 of the tractor 12 and at its rear portion by the ground-engaging wheels 20 and 22. Each plow 16 is supported by a standard 24 which in turn is connected with the mounting structure 26 for swinging movement about a horizontally extending pivot structure 28.

Figure 2:
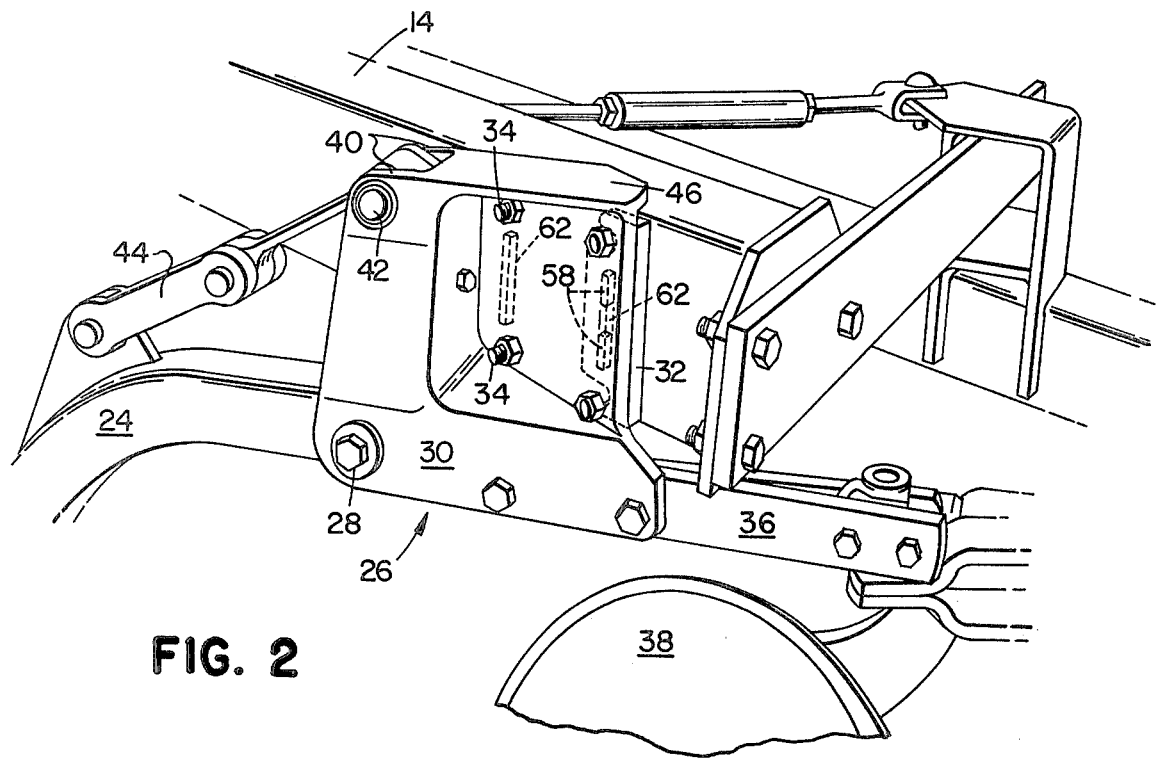
FIG. 2 is an enlarged perspective of the standard mounting structure.
Figure 5:
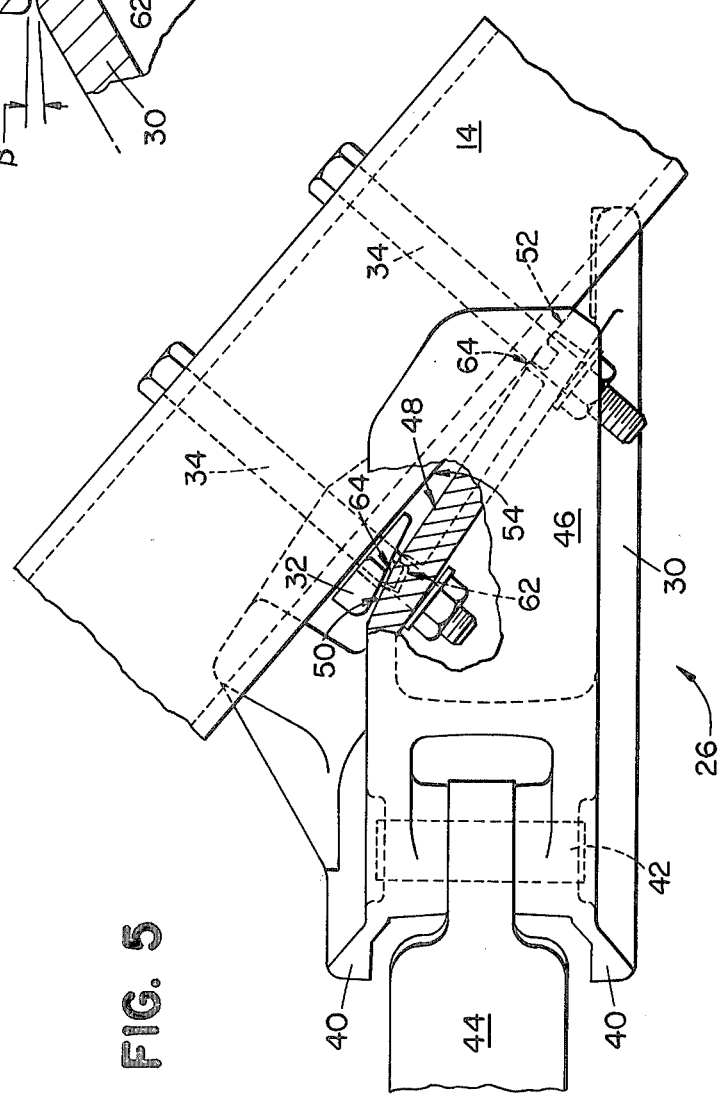
FIG. 5 is an enlarged top view of the mounting structure illustrating the wedge inserted between the rear of the bracket and the frame.

FIG. 2 illustrates an enlarged perspective of the mounting structure 26. The structure 26 includes the bracket 30 and the positioning wedge 32. The bracket 30 is secured by bolts 34 to the frame 14 and supports the forwardly extending bar 36 at its lower front portion. The bar 36 in turn supports the coulter blade 38 forwardly of the plow. The bracket 30 further includes upstanding side plates 40 which support the pivotal connections 28 and 42 respectively for the standard 24 and trip linkage 44. The top surface 46 of the bracket 30 is joined to the upstanding side plates 40 and, as best shown in FIGS. 2 and 5, extends above the frame 14 to aid in supporting the bracket 30 and to simplify alignment of the bracket 30 with the frame 14.

The bracket 30 is further provided with center, rear and front faces, numbered 48, 50 and 52 respectively, which can be selectively abutted against the vertical and flat surface 54 of the frame 14. As is best illustrated in FIG. 5, the faces 50 and 52 recede from and form respective acute angles with the plane of the center face 48. The position of the bracket 30 relative to the frame 14 determines the angle of the standard 24 relative to the frame 14 and accordingly the separation between the plows 16 or the width of cut.

Figure 3:
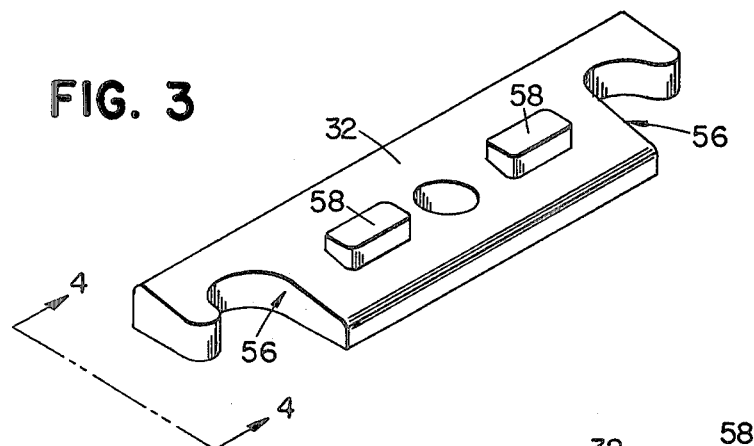
FIG. 3 is an enlarged perspective of the wedge used to adjust the mounting bracket.
Figure 4:
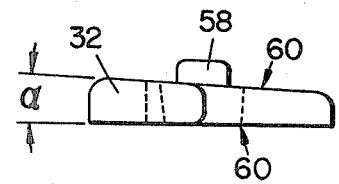
FIG. 4 is a view of the wedge taken along lines 4—4 of FIG. 3.

The generally rectangular wedge or spacer member 32, best illustrated in FIGS. 3 and 4, is utilized to selectively position any of the three faces 48, 50 or 52 against the frame 14. The wedge 32 can be inserted between the flat surface 54 and either the front face 52 or rear face 50 to change the position of the bracket 30 relative to the frame 14. When the wedge 32 is not inserted between the bracket 30 and frame 14, the center face 48 will abut the upright surface 54.

To permit the wedge 32 to be inserted around the bolts 34 which project through the bracket 32 and frame 14, it is provided with vertically spaced slots or openings 56. To hold the wedge 32 in place once inserted, there is provided lug elements 58 extending outwardly from one upright surface 60 of the wedge and receivable in the lug-receiving recesses 62 carried in the bracket 30.

When the wedge 32 is placed between the frame 14 and bracket 30 as illustrated in FIG. 2, it separates the forward portion of the bracket 30 or front and center faces 52 and 48 from the frame 14 and brings the rear face 50 of the bracket 30 into contact with the frame 14. With the bracket 30 in this position, the width of cut would be adjusted to its narrowest setting. When the wedge 32 is inserted between the rear face 50 of the bracket 30 and the frame 14 as illustrated in FIG. 5, the bracket 30 is angularly adjusted relative to the frame 14 and abuts the surface 54 at its front face 52. Removing the wedge 32 altogether causes the center face 48 to be abutted against the surface 54 of the frame 14 and the width of cut to be adjusted to its center setting.

Figure 6:
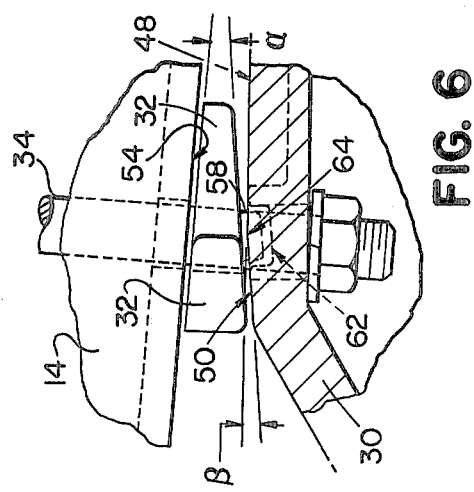
FIG. 6 is a further enlarged view of a portion of the mounting structure illustrated in FIG. 5 and showing the relative positions of the bracket, wedge and frame.

The wedge 32 is provided with opposed upright surfaces 60 which extend between wide and narrow edges. The upright surfaces 60, as best shown in FIGS. 4 and 6, diverge from one another in the preferred embodiment at an angle alpha that is approximately twice the angle beta at which the front and rear faces 52 and 50 extend outwardly from the plane of center face 48. The angle alpha at which the surfaces 60 of the wedge 32 diverge determine the separation between the bracket 30 and frame 14. Since the wedge 32 is positioned between the flat frame surface 54 and either the angled front or rear face 52 or 50, it must have sufficient thickness to separate two of the bracket faces from the frame 14 and bring the third face into full surface contact with the frame 14. Thus it must have a taper equal to the sum of the acute angles at which the front and rear faces 52 and 50 diverge from the plane of the center face 48. In the preferred embodiment, this taper would approximate 8°.

An alternate wedge embodiment is illustrated in FIGS. 7, 8 and 9. This wedge or spacer member 32 includes a more narrowly tapering edge that will abut on its sides the frame 54 and center face 48 of the bracket 30 when it is inserted. This wedge 32 includes the wider edge having an 8° angle $\alpha$, the sides 60 of which abut the face 50 and frame 54. Additionally, the narrower edge is tapered to a 4° angle $\theta$ to permit its sides 60 to abut the center face 48 of the bracket 30 and the frame 54. The wedge 32 thus provides better surface contact and support between itself and the bracket 30, particularly around the bolt 34 to reduce the stresses which occur as the bolt 34 is tightened to draw the non-parallel surfaces of the bracket 30 and frame 54 tightly together.

In the preferred embodiment, and as illustrated in FIG. 5, the bracket 30 is designed to provide a spacing between the plows 16 of approximately 400 millimeters when the front face 52 is secured to the surface of the frame 14. The rear and front faces 50 and 52 of the bracket 30 form reflex angles of approximately 184° with the center face 48 or extend outwardly from the plane of the center face 48 to form acute angles therewith of approximately 4°. This angle at the lines of intersection 64 between the faces 48 and 50 and 48 and 52 can be varied to change the spacing between the plows 16 when the front or rear faces 52 or 50 are abutted against the vertical surface 54 of the frame 14.

The preferred angle between faces 50 and 48 and 52 and 48 is selected to change the spacing between the plows 16 by approximately 50 millimeters. Consequently, abutting the rear face 50 with the vertical surface 54 of the frame 14 member for each bracket 30 along the frame 14, will space the plows 16 at approximately 400 millimeters. Abutting the forward face 52 against the vertical surface 54 of the frame 14 for each of the brackets 30 along the frame 14, will space the plows 16 at distances of approximately 500 millimeters.

To abut the rear face 50 of the bracket 30 against the surface 54 of the frame 14 requires the wedge 32 to be inserted between the front face 52 and the vertical surface 54 of the frame 14. When inserted, the wedge 32 will project beyond the line of intersection 64 between the front and center faces 52 and 48 and will separate the front and center faces 52 and 48 from the surface 54 of the frame 14 and assure full contact between the surface 54 of the frame 14 and the rear face 50. To properly gauge the depth to which the wedge 32 should be inserted, slots 56 are provided in the wedge 32 to surround the bolts 34 which project through the bracket 30. To prevent the wedge 32 from working loose and to also assure proper insertion of the wedge 32, lugs 58 project into the recesses 62 within the bracket 30. As is apparent from FIGS. 5 and 6, the bolts 34 which secure the bracket 30 to the frame 14 pass through the lines of intersection 64 between faces 50 and 48 and 52 and 48 respectively. In this way, the bolts 34 secure face 48 to the frame 14 when the wedge 32 is not inserted, and when it is inserted act to secure the other face between it and the frame 14 to the frame 14. Therefore, the wedge 32 acts as a spacer when inserted and permits the bolts 34 to securely fasten the bracket 30 to the frame 14 to resist the forces encountered by the plow 16 and its supporting standard 24.

In operation, the bracket 30 is simply and easily adjusted by a single individual using a wrench adjusted to the size of the nuts utilized with the bolts 34. When a different spacing is desired between the plows 16, the operator can simply raise the implement above the ground, support the standard and bottom, insert the wrench through the C opening of the bracket 30, loosen the bolts 34, remove the wedge 32 if it has been inserted and either reinsert it on the other side between the alternate face and the surface of the frame 14 or leave it out. The nuts are then retightened and the operator can move on to the next bracket 30 to change the angle of that bracket with respect to the frame member.

Upon having adjusted each of the brackets 30, the operator would then adjust the position of the stinger 66 relative to the frame 14. The stinger 66 which is pivotally connected at 68 to the frame, can be simply adjusted through changing the length of the turnbuckle 70 between it and the frame 14. To change the length, the operator need only remove the pin 72 securing the threaded eyebolt 74 to the stinger 66, rotate the eyebolt 74 within the internally threaded member 76 and then reinsert the pin 72. With the simple and inexpensive width adjustment mechanism provided herein, an operator can quickly and easily adjust the width of cut between earthworking tools to select the most appropriate setting for his operation.

We claim:

1. In an earthworking implement having a longitudinally extending frame member, at least two tool-carrying standards spaced along the frame member and extending therebelow, and an improved means for attaching the standards to the frame member comprising: a standard supporting bracket member; mounting structure between the bracket member and frame member including an upright surface on one member and upright first, second and third faces on the other member, said second and third faces adjoining respective sides of the first face and meeting said first face at such an angle as to form respective acute angles with the plane of the first face, each of said respective angles being substantially less than 90 degrees; means releasably fastening the bracket member to the frame member; and a spacer member locatable in a first and second position between the upright surface and the second or third faces respectively, said spacer member when in a first position between the upright surface and the second face acting to separate the first and second face from the upright surface and causing said surface and third face to abut and when in the second position between the upright surface and the third face acting to separate the first and second faces from the upright surface and causing the upright surface and second face to abut.

2. The invention defined in claim 1 wherein the spacer member has a pair of opposed upright surfaces extending between wide and narrow edges and diverging from one another at an angle substantially equal to twice the angle at which the first and third faces extend away from the plane of the first face.

3. The invention defined in claim 1 wherein the spacer member when in its first position projects between the upright surface and both the first and second faces.

4. The invention defined in claim 1 wherein the upright surface is carried by the frame member and the first, second and third faces are carried by the bracket member.

5. The invention defined in claim 4 wherein the spacer member carries an outwardly projecting lug receivable in a lug-receiving recess of the bracket member.

6. The invention defined in claim 4 wherein the fastening means includes a pair of vertically spaced and aligned openings through the frame member and each juncture on the bracket member, said openings receiving bolts therethrough to secure said members together.

7. The invention defined in claim 6 wherein the spacer member is wedge-shaped and is provided with slotted openings wherein one pair of vertically spaced bolts is received when the wedge is located in either its first or second position.

8. In an earthworking implement having a longitudinally extending frame member with an upright surface, at least two tool-carrying standards spaced along the frame member and extending below the upright surface, and an improved means for attaching the standards to the frame member comprising: a standard supporting bracket having generally upright first, second and third faces, the second and third faces adjoining each side of the first face and forming with the plane of the first face respective acute angles, each of said respective acute angles being substantially less than 90 degrees; means releasably fastening the bracket to the surface of the frame member, said means including portions projecting through one of said faces; and a wedge member receivable between the surface of the frame member and either the second or third face to separate the first face and face adjacent the wedge member from the surface of the frame member and abut the other face with the surface of the frame member, said wedge member further provided with slotted openings through which the projecting portions of the releasable fastening means can extend.

9. The invention defined in claim 8 wherein the wedge member further includes a lug projecting outwardly therefrom, said lug being receivable in a recess of the bracket when the wedge member is inserted between the frame member and bracket.

10. The invention defined in claim 8 wherein the wedge member has a pair of opposed upright surfaces extending between wide and narrow edges and diverging from one another at an angle substantially equal to twice the angle at which the first and third faces extend away from the plane of the first face.

11. The invention defined in 8 wherein the fastening means includes a pair of vertically spaced horizontally aligned openings through the bracket and frame member through which bolts are positioned to secure the bracket and frame member together.

12. The invention defined in claim 11 wherein the wedge member includes vertically spaced slotted openings through which the bolts project when said wedge member is received between the frame member and bracket.

13. The invention defined in claim 8 wherein the wedge member when in its first position projects between the upright surface and both the first and second faces.

14. In an earthworking implement having a longitudinally extending frame member with an upright surface, at least two tool-carrying standards spaced along and adjacent to the frame member and extending below the upright surface, and an improved means for attaching the standards to the upright surface comprising: a standard supporting bracket having generally upright first, second and third faces, the latter two faces adjoining respective upright sides of the first face and forming respective acute angles with the plane of the first face, said respective acute angles being substantially less than 90 degrees said bracket further having lug-receiving structure therein; a pair of horizontally extending vertically spaced openings through each respective juncture formed between the first face and its adjacent second or third face on the bracket; openings in the surface of the frame member alignable with the openings of said bracket; fastening means insertable through the openings when aligned to secure the bracket to the frame member; and a wedge member having slots alignable with either pair of vertically spaced openings in the bracket and lug elements projecting from the face of the wedge member and receivable in the aforesaid lug-receiving openings, said wedge member being removably insertable between the surface of the frame member and either the second or third face of the bracket to separate the first face and face adjacent the wedge member from the surface of the frame member and about the non-adjacent face with the surface of said frame member.

15. The invention defined in claim 14 wherein the wedge member has a pair of opposed upright surfaces extending between wide and narrow edges and diverging from one another at an angle substantially equal to twice the angle at which the first and third faces extend away from the plane of the first face.

16. The invention defined in claim 14 wherein the wedge member when in its first position projects between the upright surface and both the first and second faces.

17. In a plow having a frame including a main horizontal beam inclined to the direction of travel with a vertical side and at least one plow bottom having a standard extending below and adjacent the beam, the improvement residing in structure mounting said standard to said beam comprising: a mounting bracket having an upright side structure facing the vertical side of the beam, said upright side structure having front, central and rear upright surfaces with said front and rear surfaces extending from upright junctures with the central surface and forming substantially equal acute angles with the plane of said center surface, said side structure further having upright lug-receiving openings therein at front and rear portions thereof; bolts extending from the beam and through the side structure at said junctures for fixing the mounting bracket to the beam; an upright wedge element having narrow and wide edges and a pair of opposed upright surfaces extending between the edges and diverging from one another at an angle substantially equal to twice the angle that the rear and front surfaces extend outwardly from the plane of the central surface, said wedge element further having slots opening to the edge thereof adapted to receive the bolts and lug elements projecting from the face of the wedge receivable in the aforesaid lug-receiving openings; and means connecting the standard to the mounting bracket.

18. In a plow having a frame including a main horizontal beam structure inclined to the direction of travel with a vertical side surface and at least one plow bottom having a standard extending adjacent the beam, the improvement residing in structure mounting said standard to said beam comprising: a mounting bracket having an upright side structure facing the vertical side of the beam structure; said upright side structure having front, central and rear upright surfaces with said front and rear surfaces extending outwardly from upright junctures with the central surface at substantially equal angles therefrom; bolts extending from the beam structure and through the side structure of said bracket at said junctures for fixing the mounting bracket to the beam structure; an upright wedge element having a pair of opposed upright surfaces extending between wide and narrow edges and diverging from one another at an angle substantially equal to twice the aforesaid angle that the rear and front surfaces extend outwardly from the central surface, said wedge element further having at least one opening at its narrow edge adapted to receive the bolts; and means connecting the standard to the mounting bracket.

19. The invention defined in claim 18 in which the opening at the front edge that is adapted to receive the bolts are slots in the wedge element opening to the narrow edge and in which the wedge element may be sealed selectively between said side surface of the beam structure and said front and rear surfaces of said side structure; and further characterized by lug means extending between the wedge element and one of said structures that provide an adjacent surface to the wedge element for limiting movement of said wedge element.

20. The invention defined in claim 8 wherein the projecting portions extend through the junctures of said bracket.

* * * * *